Dec. 13, 1938.  C. F. JOHNSTON  2,140,133
PISTON EXPANDER
Filed Nov. 27, 1935
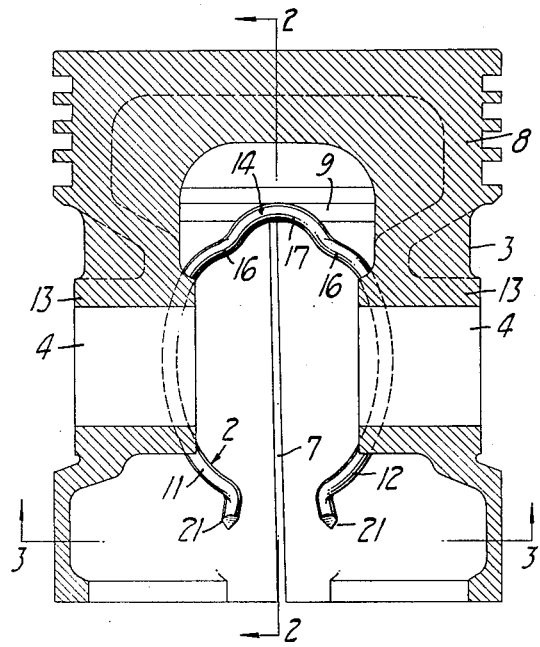
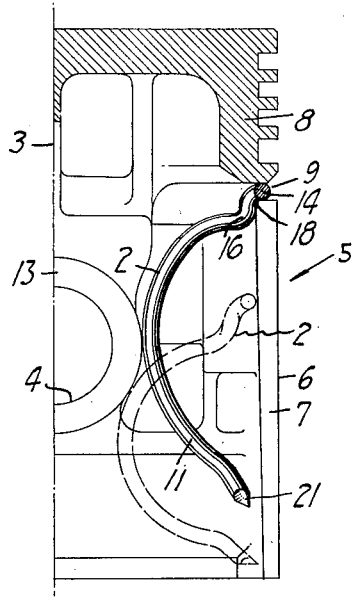
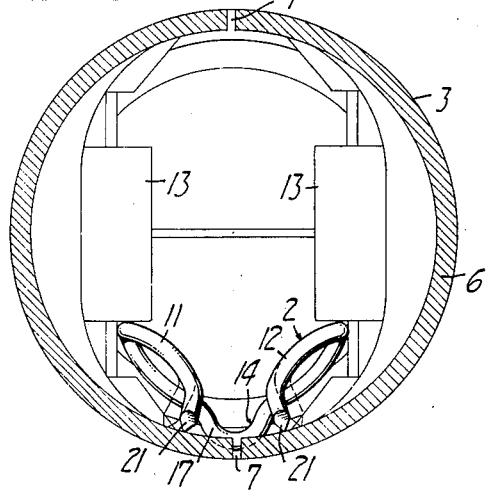
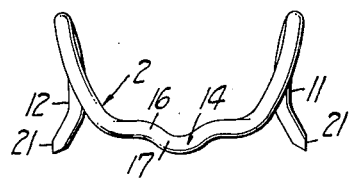
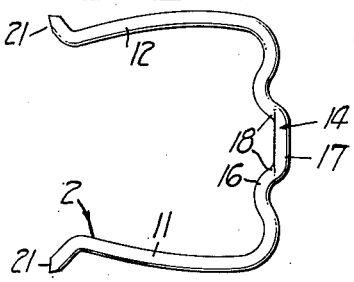
INVENTOR.
Charles F. Johnston
BY
Joseph B. Gardner
ATTORNEY.

Patented Dec. 13, 1938

2,140,133

UNITED STATES PATENT OFFICE 2,140,133

PISTON EXPANDER

Charles F. Johnston, Oakland, Calif.

Application November 27, 1935, Serial No. 51,869

7 Claims. (Cl. 309—12)

The invention relates to means which may be attached to a piston for expanding the skirt thereof, and more particularly to the type of piston expander disclosed in my previous Patent Number 2,010,518 issued August 6, 1935.

An object of the present invention is to provide a piston expander of the character described which, while engaging between the wrist pin bearing bosses and the side of the skirt on opposite sides of the longitudinal slot therein for expanding the skirt and as taught by my previous patent aforesaid, will be provided with a portion arranged to engage directly in both the longitudinal slot in the piston skirt as well as the circumferential slot at the top of the skirt, and further be of such a shape as to seat the said expander portion against circumferential displacement, to hold such portion and the expander itself against longitudinal displacement in the piston, and to wedge such portion directly into and expand the longitudinal slot in the piston skirt.

Another object of the invention is to provide a piston expander of the character above which will be extremely light in weight and yet exert a powerful and perfectly directed expanding pressure.

A further object of the invention is to provide a piston expander of the character described which may be quickly and readily installed and which will be positively locked in operative position in the piston without requiring the provision of any attaching parts on the piston or the use of any attachments between the piston and the expander and which, although not subject to a forcible withdrawal from the piston, provides for its easy removal when such is desired.

Still another object of the invention is to provide a piston expander of the character above, which will consiss of a light, one-piece member with the parts thereof so arranged as to afford, by adjustment of the expander within the piston, for an adjustment of the pressure exerted on the piston by the expander.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a rear elevation of a piston expander constructed in accordance with the present invention and illustrated in operative position on a piston shown in section.

Figure 2 is a side sectional view taken substantially on the plane of line 2—2 of Figure 1.

Figure 3 is a bottom sectional view taken substantially on the plane of line 3—3 of Figure 1.

Figure 4 is an elevational view of the expander.

Figure 5 is a front view of the expander.

Figure 6 is a plan or top view of the expander.

As illustrated in the drawing, the expander member 2 is arranged for positioning on the inside of the piston 3 such as used in an internal combustion engine. This latter type piston is commonly provided with a pair of diametrically disposed wrist pin bearings 4 and having the skirt portion 6 formed with a longitudinal slot 7 which extends from the open lower end of the piston to adjacent the ring retaining portion 8 of the piston. At the top of the piston skirt, and immediately below the ring retaining portion 8, is a circumferential or cross slot 9 which intersects the slot 7 and thereby affords a ready outward expansion of the portions of the skirt at opposite sides of the slot 7.

The expander, as will be clear from the drawing, comprises a single length of resilient wire which is bent to define a pair of spaced curved legs 11 and 12 which are resiliently compressed between the housings 13 of the wrist pin bearings 4 and the side of the piston provided with the slot 7. As a particularly important feature of the present invention, the intermediate portion 14 of the wire which connects the legs 11 and 12 is formed to engage directly in the space defined at the junction or intersection of the slots 7 and 9. As will be clear from the drawing this intermediate portion is formed with a pair of reversely related curves, the first comprising a portion 16 which is bent generally longitudinally from the curve of the legs 11 and 12, and the second portion 17 which inter-connects the sides of the portion 16 and is bent generally transversely therefrom. It is this latter portion 17 which is arranged to directly engage in the cross slots aforesaid, and to limit the insertion of the portion 17 into the slots, the sides of the portion 16 are flattened to define substantially aligned and parallel planes 18 which, subject to a wearing in of the expander, will settle against the inner side of the piston adjacent the circumferential slot. The arrangement of the compound curve between the portions 16 and 17 defines at the sides of the portion 17, when viewed from the front as shown in Figure 5, a pair of concavities which cooperate with the ends of the longitudinal slot for centering the intermediate portion of the expander against a circumferential displacement as well as a longitudinal withdrawal. Also, as may be seen from a plan view of the device as illustrated in Figure 4, the sides of the portion 17 are themselves tapered and thus operate directly on and tend to expand the longitudinal slot.

The free ends 21 of the legs are bent outwardly from the curved legs of the expander and are sharpened so as to penetrate into the surface of the inner circumference of the piston skirt at opposite sides of the slot 7. Preferably this turning out of the free ends of the legs is sufficient to enable a considerable circumferential adjustment of the positioning of these free ends with respect to the inner surface of the piston so as to vary the expansive pressure set up by the legs of the expander.

The installation of my expander in a piston of the character described may be readily effected without requiring the removal of the pistons from the engine cylinders since the presence of the crank arm assembly in no way interferes with the use of the expander. To install, the expander is first placed in the piston as shown in dotted lines in Figure 2 with the intermediate portion 14 resting on the slot 17 and the humps of the curved legs 11 and 12 resting against the wrist pin bearing housings 13. From this initial position the expander is moved into an operative position by engaging the portion 14 with a screw driver or the like and pushing this portion further into the piston thus drawing the curved legs under the bearing housing and elongating the legs and setting up an expansive force between the bearing housings and the adjacent piston wall. At the innermost position of the expander in the piston the portion 17, which is guided in its inward movement by the slot 7, springs into the space defined at the intersection of the cross slot 9 and becomes securely locked therein. At the same time the pressure upon the sharpened ends 21 causes these ends to dig into the surface of the piston skirt and further firmly lock the expander in place.

As before indicated should a greater expansion be required or desired over that obtained by the mere insertion of the expander as outlined, the expansive force set up by the expander may be very considerably increased by forcing with a punch or other tool, the free ends of the expander about the inner circumference of the skirt in the direction of the adjacent bearing housing. The locking of these ends in various circumferential positions is, as will be understood, facilitated if not made possible by the turning out of these ends as above explained.

To remove the expander, one has only to spring the legs together by means of a pair of pliers or the like or dislodge one of the ends and legs with a suitable tool.

I claim:

1. An expander for a hollow piston formed with a longitudinal and an intersecting circumferential slot in the skirt thereof comprising, a resilient wire arranged to be compressed into said piston and having a portion for engaging and expanding the portion of said skirt adjacent said longitudinal slot and having a portion offset from said first portion and arranged to seat in the space defined at the junction of said slots to hold said wire against displacement longitudinally and circumferentially of the piston, and being held by said first portion against extension through said space to the exterior of said piston.

2. In an expander for a hollow piston formed with a circumferential slot, a resilient wire defining a pair of spaced curved legs connected by an intermediate portion, said portion being bent longitudinally from the curved legs adjacent said legs and bent transversely from the first bent portion toward the center of said intermediate portion, the transversely bent portion being adapted for engagement in said slot.

3. In an expander for a hollow piston formed with a circumferential slot, a resilient wire defining a pair of spaced substantially parallel bowed legs connected by an intermediate portion, the sides of said intermediate portion joining said legs being bent longitudinally of the cord of the bow of said legs and the center of said portion being bent transversely to said cord, the transversely bent portion being arranged to engage in said slot, and said longitudinally bent portion being formed with substantially aligned parallel portions movable into engagement with said piston for limiting the extension of said transversely bent portion into said slots.

4. In an expander for a hollow piston formed with a circumferential slot, a resilient wire defining a pair of spaced curved legs connected by an intermediate portion bent from the curve of said legs and arranged on insertion of the expander into the piston to engage in said slot and hold said expander against longitudinal displacement, the free ends of said legs being bent outwardly from the curve thereof and sharpened to engage the inner circumference of said piston and to penetrate the surface thereof at an angle thereto and permitting the engagement of said sharpened ends with the inner surface of the piston at various circumferential positions.

5. In an expander for a hollow open ended piston having a pair of diametrically opposed inwardly projecting bearing bosses, a generally U shaped resilient wire arranged for insertion into the piston through said end with the intermediate portion and the free ends of said wire disposed respectively inwardly and outwardly of said bosses, the sides of said wire being bowed and arranged to be sprung between said bosses and an adjacent inner side of the piston with said intermediate portion and said ends disposed as aforesaid, said ends being outwardly turned from said wire sides and sharpened to engage the inner surface of said piston in a substantially radial direction and to penetrate said surface.

6. An expander for a hollow open ended piston having a pair of diametrically opposed inwardly projecting bearing bosses and a circumferential slot, a generally U-shaped resilient member arranged for insertion into the piston through said end with the intermediate portion and the free ends of said member disposed respectively inwardly and outwardly of said bosses, the sides of said member being bowed and arranged to be sprung between said bosses and the adjacent inner side of said piston with said intermediate portion and said ends disposed as aforesaid, said intermediate portion of said member having a longitudinal part adapted to bear on the inner side of said piston, and a transversely extending part adapted to enter said slot.

7. An expander for a hollow open ended piston formed with a circumferential slot, a generally U-shaped resilient wire defining a pair of spaced curved legs connected by an intermediate portion, said portion having a longitudinal part adapted to bear on the inner side of said piston and a transversely extending part adapted to enter said slot.

CHARLES F. JOHNSTON.